United States Patent [19]

Saito et al.

[11] Patent Number: 5,194,502
[45] Date of Patent: Mar. 16, 1993

[54] EPOXY RESIN, URETHANE-MODIFIED EPOXY RESIN AND CARBOXYLATED POLYESTER

[75] Inventors: Atsushi Saito, Nishinomiya; Yoshiya Hattori, Kyoto, both of Japan

[73] Assignee: Sunstar Giken Kabushiki Kaisha, Osaka, Japan

[21] Appl. No.: 794,886

[22] Filed: Nov. 20, 1991

[30] Foreign Application Priority Data

Nov. 20, 1990 [JP] Japan .................................. 2-317192

[51] Int. Cl.$^5$ .......................... C08L 63/02; C08L 9/02
[52] U.S. Cl. .................................... 525/111; 525/438
[58] Field of Search .......................... 525/111, 438, 113

[56] References Cited

U.S. PATENT DOCUMENTS

| | | | |
|---|---|---|---|
| 4,804,581 | 2/1989 | Geary et al. | 525/38 |
| 4,908,273 | 3/1990 | Urech et al. | 525/438 |
| 4,962,162 | 10/1990 | Kosuda et al. | 525/438 |
| 5,008,335 | 4/1991 | Pettit | 525/111 |
| 5,030,698 | 7/1991 | Mülhaupt et al. | 525/438 |
| 5,096,980 | 3/1992 | Yamazaki et al. | 525/438 |

FOREIGN PATENT DOCUMENTS 2-133421  5/1990  Japan .

*Primary Examiner*—Robert E. Sellers
*Attorney, Agent, or Firm*—Wegner, Cantor, Mueler & Player

[57] ABSTRACT

A one-pack epoxy structural adhesive for automobile which comprises 100 parts by weight of a mixture of a bisphenol epoxy resin and either one or both of an urethane-modified epoxy resin and an acrylonitrile/butadiene-modified epoxy resin as an epoxy resin component, 10 to 300 parts by weight of a polyester resin having carboxyl group at its termini, and 0.1 to 30 parts by weight of a latent curing agent. The adhesive of the present invention can be used as a structural adhesive for the weld bonding method in the structural parts of automobile wherein the adhesive shows an excellent shower resistance and the overflow of the adhesive can easily be wiped off. The adhesive of the present invention can easily be bead-applied at a temperature of around 40° C., and hence, is suited for use in the assembly or bonding of car body.

4 Claims, No Drawings

EPOXY RESIN, URETHANE-MODIFIED EPOXY RESIN AND CARBOXYLATED POLYESTER

The present invention relates to a one-pack structural epoxy adhesive for automobiles, more particularly, to a one-pack epoxy adhesive which is applicable to a weld bonding method in an assembling or bonding of car body. The adhesive of the present invention shows an excellent shower resistance and is easily scratched off when applied. Further, the adhesive is a wax-like solid at room temperature and is applicable at a suitable temperature of said method, e.g. at around 40° C.

PRIOR ART

In an assembling or bonding of the car body, there has been used a weld bonding method wherein a bonding with an adhesive is used in combination with a spot welding in order to improve a hardness of the car body. The weld bonding method is usually carried out by using a one-pack epoxy adhesive wherein a latent curing agent is added to an epoxy resin. The conventional paste-like adhesive used therein is disadvantageously scattered off or washed off by a shower of washing water in an electrodeposition coating process after the adhesion process. On the other hand, in order to prove an anti-rust property and adhesion property, an increased amount of an adhesive is applied, and as a result, the adhesive overflows in a pressing process or a spot welding process after the application, and hence, wiping off the adhesive is troublesome.

SUMMARY DESCRIPTION OF THE INVENTION

Under the circumstances, the present inventors have intensively studied as to a one-pack epoxy adhesive which has an excellent shower resistance and can easily be wiped off, and as a result, have found that an adhesive in the state of a wax-like solid at room temperature can be prepared by adding a polyester resin having carboxyl groups at its termini to a system comprising a mixture of specific epoxy resins and a latent curing agent. Since the adhesive of the present invention is in the state of a wax-like solid, the scattering or washing-off of the adhesive by a shower of washing water can be avoided and further the overflow of the adhesive, which is in the state of properly solidified wax, can easily be scratched off. The adhesive of the present invention can easily be bead-applied at a temperature usually adopted for application of adhesive (i.e. both a pump temperature and a hose temperature are around 40° C).

An object of the present invention is to provide a one-pack epoxy structural adhesive for automobiles which comprises 100 parts (part by weight, hereinafter the same) of a mixture of a bisphenol epoxy resin, an urethane-modified epoxy resin and/or an acrylonitrile/-butadiene(NBR)-modified epoxy resin as an epoxy resin component, 10 to 300 parts of a polyester resin having carboxyl groups at its termini, and 0.1 to 30 parts of a latent curing agent. These and other objects and advantages of the present invention will be apparent to those skilled in the art from the following description.

DETAILED DESCRIPTION OF THE INVENTION

The epoxy resin component used in the adhesive of the present invention is a mixture of a bisphenol epoxy resin, an urethane-modified epoxy resin and/or an NBR-modified epoxy resin. The urethane-modified epoxy resin and the NBR-modified epoxy resin provide a flexibility and a toughness to improve the peeling strength and are used in an amount selected from a range of 20 to 95% (% by weight, hereinafter the same), preferably 50 to 90%, based on a total amount of the epoxy resin component. When the amount is less than 20%, a desired effect cannot be obtained, and when the amount is over 95%, the heat resistance of the adhesive is detrimentally decreased.

The bisphenol epoxy resin includes, for example, bisphenol A, bisphenol F, brominated bisphenol A, a diglycidyl ether of bisphenol AD, a diglycidyl ether of an alkylene oxide adduct of bisphenol A, and the like.

The urethane-modified epoxy resin used in the adhesive of the present invention is one prepared by reacting a polyoxyalkylene ether polyol or polytetramethylene ether glycol with an excess amount of diisocyanate (e.g. tolylene diisocyanate, diphenylmethane diisocyanate, naphthalene diisocyanate, isophorone diisocyanate, hexamethylene diisocyanate, etc. ) to give an urethane prepolymer having free isocyanate groups at its termini, which is then reacted with an epoxy resin containing at least one hydroxyl group in a molecule (e.g. a diglycidyl ether of bisphenol A, a diglycidyl ether of an aliphatic polyvalent alcohol, glycidol, etc.), wherein the epoxy resin is reacted in an amount of 5 parts to 100 parts of the urethane prepolymer.

The NBR-modified epoxy resin used in the adhesive of the present invention is one prepared by reacting a bisphenol epoxy resin with NBR.

The polyester resin having carboxyl groups at its termini used in the adhesive of the present invention is one prepared by a condensation polymerization of an excess amount of a polybasic acid (e.g. phthalic acid, phthalic anhydride, terephthalic acid, isophthalic acid, adipic acid, sebacic acid, trimellitic acid, trimesic acid, etc.) and a polyvalent alcohol (e.g. ethylene glycol, diethylene glycol, propylene glycol, butylene glycol, neopentyl glycol, hexanediol, etc.). By adding this polyester resin, which itself is amorphous or a partially crystalline solid at room temperature, alone or in combinations thereof to the one-pack epoxy adhesive containing a latent curing agent, there can be obtained an epoxy adhesive which is in the state of a wax-like solid at room temperature and can be made fluid by heating at 40° C. or more. The polyester resin having carboxyl groups at its termini is used in an amount of 10 to 300 parts, preferably 25 to 200 parts, per 100 parts of the epoxy resin component. When the amount of the polyester resin is less than 10 parts, the epoxy adhesive in the state of a wax-like solid cannot be obtained, and when the amount is over 300 parts, an adhesive strength required for a structural adhesive is detrimentally lowered.

The latent curing agent used in the adhesive of the present invention is one activated at a temperature ranging from 100° to 200° C. and includes, for example, dicyandiamide, 4,4'-diaminodiphenylsulfone, imidazole and a derivative thereof (e.g. 2-n-heptadecylimidazole, etc.), isophthalic acid dihydrazide, an N,N'-dialkyl derivative of urea, an N,N'-dialkylthio derivative of urea, a melamine derivative, and the like. The above curing agent is used alone or as a mixture of two or more thereof. An amount of the latent curing agent is selected from a range of from 0.1 to 30 parts, preferably from 3 to 20 parts, per 100 parts of the epoxy resin component. When the amount is over 30 parts, adhesion strength goes down because the formed polymer is brittle, and when the amount is less than 0.1 parts, it doesn't cure.

The one-pack structural epoxy adhesive for automobiles of the present invention comprises the epoxy resin, the polyester resin having carboxyl groups at its termini and the latent curing agent in the above-mentioned amount. The adhesive of the present invention further contains, if necessary, an electroconductive material (e.g. metal powder, carbon black, graphite powder, metal oxide powder, etc.), a rust inhibiting pigment, a filler (e.g. calcium carbonate, clay, silica, talc, etc.), a plasticizer, a solvent, and the like.

The adhesive of the present invention can be used as a structural adhesive for the weld bonding method in the structural parts of an automobile such as hemming (e.g. door, hood, trunk, etc.), pillar, roof rail, etc. wherein the adhesive shows an excellent shower resistance and the overflow of the adhesive can easily be wiped off since it is in the state of a wax-like solid at room temperature. Furthermore, the adhesive of the present invention can easily be bead-applied at a temperature of around 40° C., and hence, is suited for use in the assembly or bonding of a car body.

The present invention is explained in more detail by the following Examples and Reference Examples but should not be construed to be limited thereto.

EXAMPLES 1 AND REFERENCE EXAMPLES 1 AND 2

The components in an amount as shown in Table 1 were mixed together to prepare an adhesive composition. The obtained adhesive compositions were subjected to various tests. The results are also shown in Table 1.

TABLE 1

|  | Example | | Reference Ex. | |
|---|---|---|---|---|
|  | 1 | 2 | 1 | 2 |
| Bisphenol epoxy resin*[1] | 30 | 30 | 30 | 30 |
| Urethane-modified epoxy resin*[2] | 70 | — | 70 | 70 |
| NBR-modified epoxy resin*[3] | — | 70 | — | — |
| Polyester resin having carboxyl group at its termini*[4] | 30 | 100 | 5 | — |
| Dicyandiamide | 8 | 8 | 8 | 8 |
| Imidazole | 2 | 2 | 2 | 2 |
| Filler | 50 | 50 | 50 | 50 |
| Shear strength | 290 | 290 | 290 | 290 |
| Peeling strength | 30 | 33 | 22 | 20 |
| Shower resistance | o | o | x | x |
| Easiness to be wiped off | o | o | x | x |

(note)
*[1]Epicote 828 manufactured by Yuka Shell Epoxy Co. Ltd.
*[2]EPU-73 having an epoxy equivalent of 220 to 250 manufactured by Asahi Denka Kogyo K.K.
*[3]A flask charged with a stirrer, a thermometer and a condenser is charged with bisphenol A epoxy resin having an epoxy equivalent of 215 (manufactured by Yuka Shell Co. Ltd.; Epocote 807) (60 parts) and butadiene-acrylonitrile(meth)acryric acid copolymer (manufactured by Nippon Zeon Co., Ltd.; Nipole DN-601) (40 parts) and the mixture is reacted at 120° C. for 6 hours to give NBR-modified epoxy resin having an acid value of 0.2 and an epoxy equivalent of 450.
*[4]Dynacoll 8350 manufactured by Huls

SHEET STRENGTH TEST

The test was conducted under the following conditions:
Material: SPCC-SD steel plate (1.6×25×100 mm); lapping 12.5×25 mm.
Curing condition: 180° C.×20 minutes.
Thickness of the adhesive: 0.15 mm (applied at 40° C.).
The measurement was made at 20° C. with a pulling speed of 5 mm/minutes.

PEELING STRENGTH TEST

The test was conducted under the following conditions:
Curing condition: 180° C.×20 minutes.
Thickness of the adhesive: 0.15 mm (applied at 40° C.).
The measurement was made at 20° C. with a pulling speed of 200 mm/minutes.

SHOWER RESISTANCE TEST

To a degreased steel plate was bead-applied the adhesive heated at 40° C. at 3 mm φ to prepare a test piece (TP). Each TP was fixed at an angle of 45° against a shower nozzle and was given a shower of warm water at 30° C. at water pressure of 4 kg·f/cm² for 1 minute (distance between the nozzle and TP: 70 cm). After completion of shower, the condition of the adhesive was observed.
o: The adhesive remains virtually as it stands.
x: The adhesive is completely blown off.

TEST FOR EASINESS TO BE WIPED OFF

After the adhesive heated at 40° C. was bead-applied to a degreased steel plate at 3 mm φ, the adhesive was attempted to be scraped off and the easiness of the adhesive to be wiped off was observed.
o: The adhesive can be wiped off.
x: The adhesive cannot easily be wiped off and a lot of the adhesive remains unwiped.

What is claimed is:
1. A one-pack epoxy structural adhesive for automobiles which comprises
100 parts by weight of a mixture of a bisphenol epoxy resin and an urethane-modified epoxy resin as an epoxy resin component,
10 to 300 parts by weight of a polyester resin having carboxyl groups at its termini, and
0.1 to 30 parts by weight of a latent curing agent.
2. The adhesive of claim 1 wherein the ratio of the urethane-modified epoxy resin to the total amount of the epoxy resin component is 20 to 95% by weight.
3. The adhesive of claim 1 wherein 25 to 200 parts of the polyester resin and 3 to 20 parts of the latent curing agent are used to 100 parts of the mixture of epoxy resin.
4. The adhesive of claim 1 wherein the latent curing agent is selected from the group consisting of dicyaniamide, 4,4'-diaminodiphenylsulfone, imidazole, 2-n-heptadecylimidazole, isophthalic acid dihydrazide, an N,N'-dialkyl derivative of urea, an N,N'-dialkylthio derivative of urea and a melamine derivative.

* * * * *